United States Patent [19]

Dohrmann

[11] Patent Number: 4,789,033
[45] Date of Patent: Dec. 6, 1988

[54] ONBOARD WEIGHT INDICATOR FOR VEHICLES

[76] Inventor: David K. Dohrmann, 11 Valley Pride, So. Hutchinson, Kans. 67505

[21] Appl. No.: 101,744

[22] Filed: Sep. 28, 1987

[51] Int. Cl.$^4$ ...................... G01G 19/08; G01G 21/28
[52] U.S. Cl. ...................................... 177/137; 177/244
[58] Field of Search ................................. 177/136–138

[56] References Cited

U.S. PATENT DOCUMENTS

| | | | |
|---|---|---|---|
| 3,648,790 | 3/1972 | Bishop | 177/137 |
| 3,857,093 | 12/1974 | Green | 177/137 X |
| 3,955,636 | 5/1976 | Askew | 177/137 |
| 4,623,029 | 11/1986 | Bambauer et al. | 177/137 |

*Primary Examiner*—George H. Miller, Jr.
*Attorney, Agent, or Firm*—Kokjer, Kircher, Bradley, Wharton, Bowman & Johnson

[57] ABSTRACT

An onboard device for determining the weight of a vehicle. A transducer is coupled at one end with a fixed point on the vehicle and is coupled at the other end with a single or tandem axle of the vehicle. The transducer measures the change in distance between the fixed point and the axle and sends an electrical signal to a display unit. The display unit processes the signal and displays the vehicle weight which corresponds to the signal received from the transducer. An upper carriage mounts the upper end of the transducer to the fixed point on the vehicle. A lower carriage couples the lower end of the transducer with the axle. Telescoping pipes shield the transducer. A grade compensating device corrects the signal generated by the transducer to compensate for nonlevel surfaces.

10 Claims, 2 Drawing Sheets

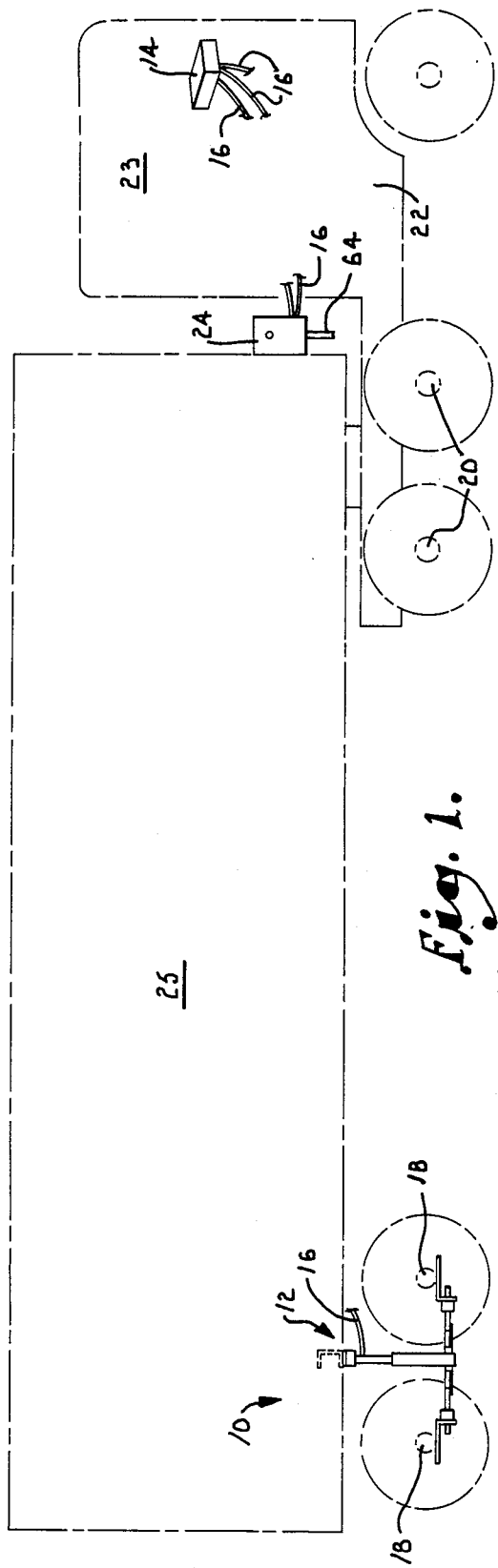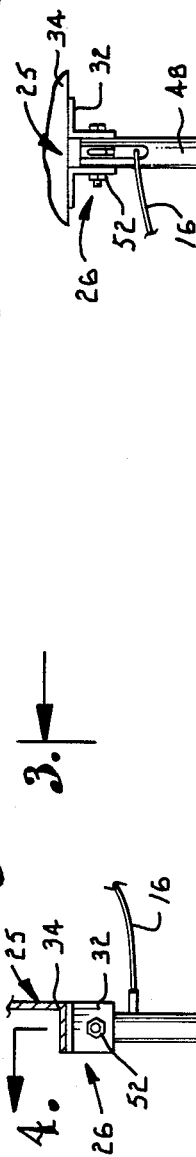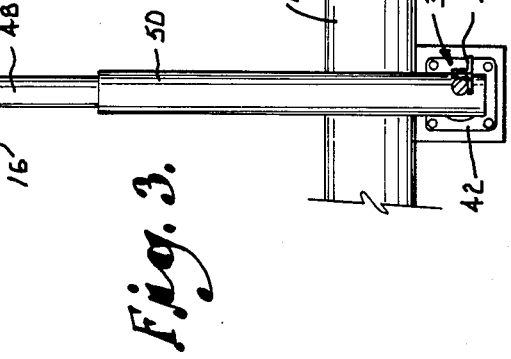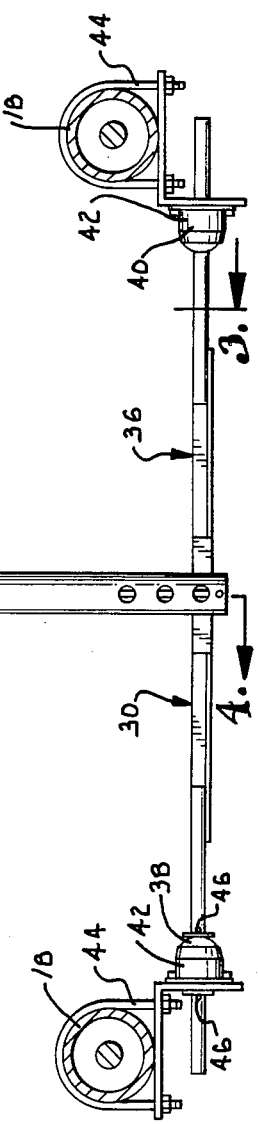
Fig. 1.
Fig. 2.
Fig. 3.

ONBOARD WEIGHT INDICATOR FOR VEHICLES

BACKGROUND OF THE INVENTION

This invention relates in general to weight measuring devices, more particularly, to an onboard device for measuring the weight of a load applied to a vehicle.

Accurate determination of the weight of a vehicle is important in the freight hauling business because of weight limitations imposed on vehicles by many states. Weight scales are commonly used for determining the weight of a load but they are often not available or are located a considerable distance from the location where a truck driver takes on a new load. The trucker must then estimate the weight of the load and this often results in the vehicle weight being above the legal limit. The trucker then risks receiving a ticket or a fine for violating state weight restrictions. In order to ensure that the vehicle is not overloaded, the trucker may take on a load significantly below that which would otherwise be allowable. This is undesirable in those situations where the truck driver's compensation is based upon the weight of the load being hauled.

Even when weight scales are available, there are normally lines of vehicles waiting to use the scales. The resulting delays can pose significant problems for truckers who are following a tight schedule. This can be a particularly acute problem in situations where the weight is determined to be above or significantly below the legal limit. The truck must then be returned to the loading dock to remove or add some cargo. The vehicle should then be reweighed to ensure that the vehicle weight is correct. Significant delays can also occur in situations where the weight of the load rather than the overall weight of the vehicle must be determined. In such cases the vehicle must be weighed while empty to establish a vehicle to determine a gross weight. To avoid these delays
ed with conventional weighing facilities, many loads are simply hauled without being weighed.

SUMMARY OF THE INVENTION

It is an object of this invention to provide a device which may be used to quickly and accurately determine the weight of a load applied to a vehicle so that delays associated with conventional weighing techniques are avoided.

It is another object of this invention to provide an onboard weighing device which may be used to easily check the weight of a vehicle so that the vehicle may be loaded to the allowable weight limit while parked at the loading dock.

To accomplish these and other objects of the invention, an onboard device such as a transducer is coupled with a fixed point on the vehicle and with a single or tandem axle of the vehicle. When a load is applied to the vehicle, the transducer measures the change in distance between the fixed point and the axles and transmits a signal to a display unit which may be mounted in the cab of the vehicle. The display unit processes the signal and displays a weight which correlates to the change in distance between the fixed point and axles. This allows the weight of the load to be quickly and accurately determined while the vehicle is being loaded.

A device such as a pendulum and a potentiometer may also be mounted on the vehicle and coupled with the display unit to compensate for any inaccuracy in measuring the weight which might otherwise result from the vehicle being parked on an unlevel surface. The pendulum is coupled with and adjusts the potentiometer when the vehicle is parked on a grade. The potentiometer then sends a signal to the display unit to correct the weight signal received from the transducer.

BRIEF DESCRIPTION OF THE DRAWINGS

Referring now to the drawings where like reference numerals are used to indicate like parts in the various views:

FIG. 1 is a side elevational view of a weight indicating device of the present invention coupled with truck and trailer;

FIG. 2 is a side elevational view of the weight device shown coupled with the trailer in FIG. 1;

FIG. 3 is a fragmentary front elevational view of the weight device taken along line 3—3 of FIG. 2;

DESCRIPTION OF THE PREFERRED EMBODIMENTS

Figure 5:
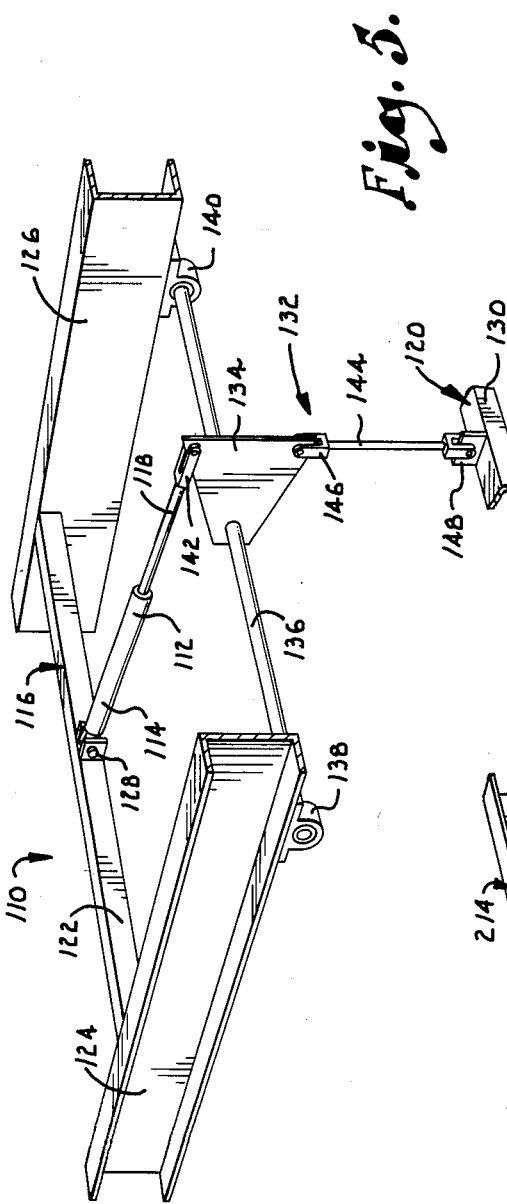
FIG. 5 is a perspective view of another embodiment of the weight device of the present invention.

Referring now to the drawings more specifically and initially to FIGS. 1–4, the numeral 10 represents one embodiment of an onboard vehicle weighing device. The device 10 operates by measuring the nonlinear deflection of the vehicle springs resulting from the weight of the vehicle and correlating that deflection with the vehicle weight.

Turning to FIG. 1, the weight indicator 10 comprises a transducer unit 12 which measures the vehicle spring deflection and is coupled with a display unit 14 by conductors 16. Depending upon the desired application, the transducer unit 12 may be centrally mounted at the trailer tandem axles 18, the tandem drive axles 20 of the truck 22 or both. The display unit 14 is preferrably mounted in the truck cab 23 at a location which is accessible to the truck driver. A grade compensating device 24 mounted on the frame of trailer 25 is coupled with display unit 14 by suitable conductors 16.

As best shown in FIG. 2, the transducer unit 12 comprises an upper carriage 26 which is coupled with a fixed point on the trailer 25 and a lower carriage 30 which is coupled with the trailer tandem axles 18. Upper carriage 26 comprises a mounting bracket 32 which is connected to a beam 34 or other supporting element of the trailer 25. Lower carriage 30 comprises a horizontally oriented bar 36 which is coupled at opposed ends with linear bearings 38 and 40. Bearings 38 and 40 are mounted in flange housings 42 which are coupled with axles 18 by U-shaped clamps 44. The bearings are generally spherical in shape with a central aperture through which the cylindrical ends of bar 36 extend. One end of the bar is fixed to the bearing 38 by pins 46 to prevent movement of the bar in relation to the bearing. The other end of the bar is free to move in and out of bearing 40. Wipers may be provided on either side of bearing 40 to prevent dirt and other abrasive material from entering the housing 42.

A pair of telescoping pipes 48 and 50 extend vertically between the upper and lower carriages 26 and 30. Upper pipe 48 is coupled with mounting bracket 32 by a nut and bolt 52 and remains fixedly positioned in relation to the trailer 25. Lower pipe 50 is bolted to a central portion of bar 36 and may move vertically in response to loading of the vehicle. The bearing 40 which couples bar 36 to axle 18 compensates for relative movement between the tandem axles 18 and allows the pipes to maintain a vertical orientation.

Figure 4:
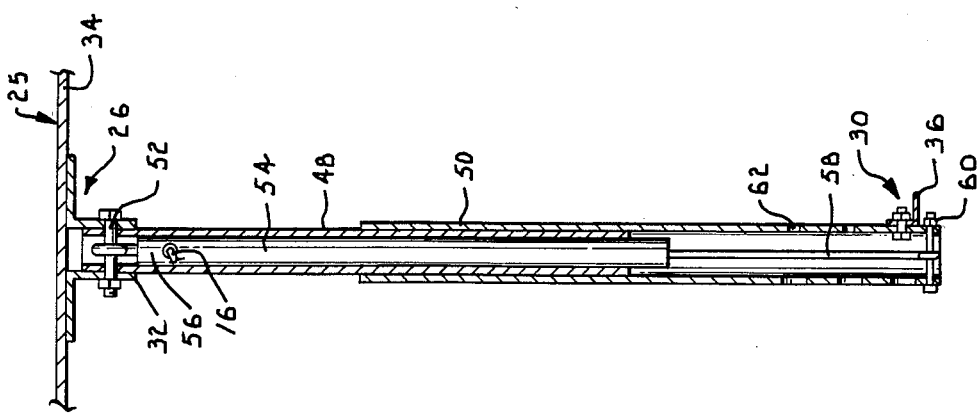
FIG. 4 is a front elevational view shown in section and taken along line 4—4 of FIG. 2.

The telescoping pipes 48 and 50 encase a transducer 54 which is coupled with the upper and lower carriages as can be seen with reference to FIG. 4. Transducer 54 may one of a variety of types of transducers such as those which deliver pulses or an analog signal proportional to the distance between the ends of the transducer. The analog type transducer may be driven by direct current or alternating current. A pulse encoder type of transducer is generally driven by mechanical means.

Transducer 54 is coupled at an upper end 56 with the bolt 52 which extends through the pipe 48 and mounting bracket 24. A lower end 58 of the transducer is coupled with a bolt 60 which extends through the lower pipe. A series of holes 62 extend through the pipe 50 to allow for variable vertical positioning of the lower end of the transducer to allow the device to be easily adapted for mounting on a range of vehicles.

Transducer 54 is coupled with the display unit 14 by conducter 16 which carries the signal generated by the transducer. The unit 14 processes the signal received from the transducer and displays a reading indicating the vehicle axle weight. Various types of available display units are capable of performing the function of correlating a signal with a predetermined weight and deflection relationship. These units are generally driven by a 12 volt dc battery.

In use, the weight indicator 10 determines the vehicle axle weight by measuring the change in distance between a fixed point 34 on the trailer and the vehicle axles 18. The weight of the vehicle and the application of a load to the vehicle causes a nonlinear deflection of the vehicle springs and decreases the distance between the axles 18 and the trailer 25. The upper carriage 26 which is coupled with a fixed point on the trailer and the lower carriage 30 which is coupled with the axles 18 also reflect this change in distance. The transducer 54 which is coupled between the lower and upper carriages measures the vertical deflection and sends a signal proportional to the deflection to the display unit 14 for processing.

When the signal generated by the transducer 54 is received by the display unit 14, it is processed and the axle weight is displayed. The unit may also be calibrated to indicate the overall vehicle weight for applications when the separate weight of the cargo is not needed. The accuracy of the displayed weight depends upon the type of unit utilized. Some units compute the weight by interpolating along a line between two points. These points generally correspond to the unloaded and target weight deflection of the vehicle springs. Due to the nonlinear deflection of the springs the accuracy of these units increases as the target weight is approached. Other types of units utilize many reference points to more closely approximate the weight and deflection curve. These units provide a more accurate indication of the vehicle load over the entire vehicle weight range and are generally preferred.

To accurately determine the relative change in distance between the upper and lower carriages it is important that the transducer be vertically oriented. The bearing 40 which couples the lower carriage bar 36 with the axle 18 compensates for relative movement between the axles and ensures that the point at which the transducer is coupled with the lower carriage remains vertically aligned beneath the fixed point on the trailer. The telescoping pipes 48 and 50 enable unrestricted movement of the transducer while protecting the transducer from damage which might result from impact by road debris.

When the trailer 25 is parked on an inclined surface, the deflection of the leaf springs varies from the deflection resulting when the trailer is parked on a level surface. The grade compensating device 24 corrects the transducer signal to compensate for nonlevel surfaces. The device comprises a pendulum 64 which is coupled with a potentiometer (not shown). The pendulum swings to a vertically aligned position and adjusts the potentiometer when the longitudinal axis of the trailer is not horizontally aligned. The potentiometer then sends a signal to the display unit 14 which trims the signal transmitted by the transducer 54 to compensate for the grade of the surface on which the trailer is parked. Other suitable devices may also be used to correct the signal and compensate for nonlevel surfaces.

The weight indicator 10 allows the truck driver to accurately determine the weight of the load being applied to the vehicle while the loading is taking place. By being able to determine the vehicle weight while parked at the loading dock, the driver is able to avoid the significant delays which frequently occur in driving to a weight scale and returning for load adjustments when the weight deviates from the allowed maximum. The weight indicator 10 also eliminates the delays associated with weighing the vehicle twice to determine the weight of the load.

Turning now to FIG. 5, another embodiment of a weight indicator which may be used in applications with vertical space limitations is represented generally by the numeral 110. Indicator 110 is similar to the indicator 10 previously described but comprises a horizontally oriented transducer 112 which is coupled at one end 114 with an upper carriage 116 and at the other end 118 with a lower carriage 120. Upper carriage 116 comprises a cross beam 122 which serves as a fixed reference point and is mounted between trailer support beams 124 and 126. A mounting bracket 128 connects the beam 116 with transducer 112. Lower carriage 120 comprises a bar 130 which is coupled with the vehicle axles in a manner similar to that shown in FIG. 2 with respect to weight indicator 10.

A coupling device 132 connects transducer end 118 with the lower carriage. Device 132 comprises a triangular shaped disk 134 which is coupled at one corner with a rotating pivot bar 136. Bar 136 is mounted by bearings 138 and 140 onto beams 124 and 126. End 118 of transducer 112 is mounted onto another corner of the the disk 134 by bracket 142. A connecting rod 144 is coupled at one end with the remaining corner of the disk by bracket 146. The other end of the rod 144 is coupled with the lower carriage by bracket 148.

The coupling device 132 is advantagous in that it transforms the vertical deflection caused by the weight of the load into a horizontal deflection which is measured by the transducer 112. This allows the weight indicator 110 to be utilized in applications where space limitations would prevent the use of a vertically mounted transducer.

Figure 6:
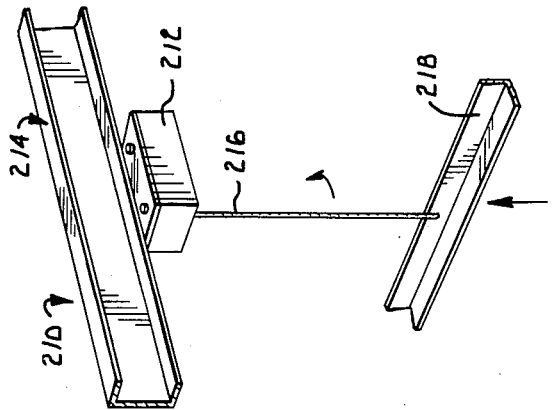
FIG. 6 is a perspective view of a further embodiment of the weight device of the present invention.

Turning now to FIG. 6, a still further embodiment of a weight indicating device is represented generally by the numeral 210. Indicator 210 is similar to those previously described but utilizes a rotary transducer 212 in place of the linear transducers. Transducer 212 is mounted on an upper carriage 214 which is fixedly mounted on the vehicle. The transducer includes a cable 216 which is coupled with a lower carriage 218. The cable 216 is coupled with a recoil (not shown) within the housing of the transducer. The lower carriage 218 is mounted on the vehicle axles in a manner similar to that described with reference to the other embodiments.

The transducer 216 transmits an electrical signal in response to the recoil of the cable 216 when the distance between the upper and lower carriages 214 and 216 decreases. The signal is then sent to a display unit (not shown) where it is correlated with a weight in a manner previously described. The weight indicator 210 may also be used in applications with vertical height restraints.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. An outboard weighing device for measuring the weight of, or a load applied to, a vehicle having dual axles, said device comprising:
    a vertically oriented transducer coupled at an upper end with a fixed point on said vehicle and at a lower end with said vehicle axles for measuring the distance between said fixed point and said axles and then transmitting an electrical signal corresponding to said distance;
    a mounting carriage extending between said axles and coupling said transducer lower end with said axles at a position intermediate the axles; and
    means for allowing longitudinal movement of said mounting carriage in response to relative movement of said axles to maintain said transducer in a substantially vertical orientation.

2. The invention of claim 1, including a unit coupled with said transducer for receiving said signal and correlating said signal with a vehicle or load weight and then displaying said weight.

3. The invention of claim 2, including leveling means coupled with said unit for sensing any deviation of said vehicle from a level orientation and adjusting said signal to compensate for said deviation.

4. The invention of claim 1, wherein said lower end of said transducer is vertically displayed from said axles.

5. The invention of claim 1, wherein said means comprises a linear coupled with one end of said mounting carriage to allow longitudinal displacement of said carriage through said bearing to maintain substantially vertical orientation of said transducer.

6. The invention of claim 1, including a pair of telescoping pipes encasing said transducer, one of said pipes coupled with said mounting carriage and the other pipe coupled with said fixed point on said vehicle.

7. An onboard weighing device for measuring the weight of, or a load applied to, a vehicle having dual axles, said device comprising:
    a generally horizontally oriented transducer coupled with said vehicle for measuring the distance between a fixed point on the vehicle and said axles and then transmitting an electrical signal corresponding to said distance;
    an upper mounting carriage coupling a first end of said transducer with said vehicle;
    a lower mounting carriage extending between said axles;
    a generally vertically oriented linkage pivotally coupling a second end of said transducer with said lower mounting carriage at a position intermediate the axles; and
    means for allowing longitudinal movement of said lower mounting carriage in response to relative movement of said axles to maintain said linkage in a substantially vertical orientation.

8. The invention of claim 7, including a unit coupled with said transducer for receiving said signal and correlating said signal with a vehicle or load weight and then displaying said weight.

9. The invention of claim 8, including leveling means coupled with said unit for sensing any deviation of said vehicle from a level orientation and adjusting said signal to compensate for said deviation.

10. The invention of claim 7, wherein said means comprises a linear bearing coupled with one end of said lower mounting carriage to allow longitudinal displacement of said carriage through said bearing to maintain substantially vertical orientation of said linkage.

* * * * *

UNITED STATES PATENT AND TRADEMARK OFFICE
CERTIFICATE OF CORRECTION

PATENT NO. : 4,789,033
DATED : December 6, 1988
INVENTOR(S) : David K. Dohrmann

It is certified that error appears in the above-indentified patent and that said Letters Patent is hereby corrected as shown below:

Column 1, line 5, after "devices,", insert the word -- and --.

Column 1, line 37, after "establish a", insert -- tare and must also be weighed with the load applied to the --.

Column 1, line 39, delete "ed" and substitute therefor -- associated --.

Column 3, line 19, delete "24" and substitute -- 34 --.

Signed and Sealed this

Twenty-fifth Day of October, 1994

Attest:

BRUCE LEHMAN

Attesting Officer

Commissioner of Patents and Trademarks